(12) United States Patent
Mott

(10) Patent No.: US 7,415,648 B2
(45) Date of Patent: Aug. 19, 2008

(54) METHOD AND SYSTEM FOR TESTING A NETWORK INTERFACE

(75) Inventor: Jordan C. Mott, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 943 days.

(21) Appl. No.: 10/888,239

(22) Filed: Jul. 9, 2004

(65) Prior Publication Data

US 2006/0007866 A1    Jan. 12, 2006

(51) Int. Cl.
*G06F 11/00* (2006.01)
(52) U.S. Cl. ........................... 714/739; 714/741
(58) Field of Classification Search ................ 714/738, 714/32, 724, 739, 741
See application file for complete search history.

(56) References Cited

U.S. PATENT DOCUMENTS

| | | | | |
|---|---|---|---|---|
| 5,729,554 A | * | 3/1998 | Weir et al. | 714/739 |
| 5,745,501 A | * | 4/1998 | Garner et al. | 714/741 |
| 5,983,001 A | * | 11/1999 | Boughner et al. | 714/38 |
| 6,826,716 B2 | * | 11/2004 | Mason | 714/38 |
| 7,076,713 B1 | * | 7/2006 | Hess | 714/741 |

* cited by examiner

*Primary Examiner*—David Ton

(57) ABSTRACT

A method for testing a network interface is provided that includes generating a data pattern file based on a pseudocode file and testing the interface using the data pattern file. The pseudocode file defines an order for a plurality of data patterns in the data pattern file. The data pattern file is provided to a testing device that may test the interface using the data pattern file by applying the data patterns from the data pattern file to the interface.

20 Claims, 3 Drawing Sheets

METHOD AND SYSTEM FOR TESTING A NETWORK INTERFACE

TECHNICAL FIELD OF THE INVENTION

The present invention is directed in general to telecommunications networks and, more specifically, to a method and system for testing a network interface.

BACKGROUND OF THE INVENTION

The use of wireless communication devices and wireless networks has become increasingly widespread. As the use of wireless communication devices increases, products are being developed with complex network interfaces that require extensive testing to ensure acceptable performance in the network.

In order to thoroughly test a new interface, all data combinations should be tested to verify that the new design is robust and free of faults. Accomplishing this type of testing, however, requires complex data patterns that are unique to the new interface being tested, including data patterns that simulate interface impairment.

Conventional devices used for testing new interfaces only provide for limited impairment testing. Thus, these testing devices fail to provide complete coverage of all network conditions. For example, in a standard testing device for testing a high-level data link control (HDLC) interface, testing impairment of the interface is limited to the insertion of frame check sequence errors. Conventional test equipment systems do not provide an operator with a flexible method of applying customizes patterns of stimuli to a unit-under-test (UUT), such as an HDLC interface.

Therefore, there is a need in the art for an improved system for testing network interfaces. In particular, there is a need for a thorough test that incorporates essentially all valid data patterns that may be applied to a network interface without limiting impairment options and without requiring a designer to design every possible data pattern.

SUMMARY OF THE INVENTION

According to one embodiment of the present invention, a method for testing a network interface is provided that includes generating a data pattern file based on a pseudocode file and testing the interface using the data pattern file. The pseudocode file defines an order for a plurality of data patterns in the data pattern file. The data pattern file is provided to a testing device that tests the interface by applying the data patterns from the data pattern file to the interface.

The present invention also provides a method for generating data patterns for testing a network interface comprising the step opening a pseudocode file. For each command in the pseudocode file, a command type and at least one parameter associated with the command are identified. In addition, for each command in the pseudocode file, a binary sequence is generated based on the identified command type and at least one parameter. The binary sequences are stored in a binary file. Each binary sequence corresponds to a data pattern for testing the interface.

According to yet another embodiment of the present invention, a pattern generator capable of generating data patterns for testing a network interface is provided comprising a pseudocode memory and a pseudocode converter. The pseudocode memory stores at least one pseudocode file. The pseudocode converter is coupled to the pseudocode memory and generates a data pattern file based on the pseudocode file.

According to still another embodiment of the present invention, a system for testing a network interface is provided comprising a pattern generator and a testing device. The pattern generator generates a data pattern file based on a pseudocode file. The pseudocode file defines an order for a plurality of data patterns in the data pattern file. The testing device is coupled to the pattern generator, receives the data pattern file from the pattern generator, and tests the interface using the data pattern file.

The present invention provides an improved method for testing a network interface. In a particular embodiment, a pseudocode converter converts pseudocode into data patterns for testing the interface. The pseudocode identifies essentially all valid data patterns that may be generated, and each data pattern includes options that allow the designer to choose impairment options for the item being generated. In addition, the designer may specify the order in which data patterns will be applied to the interface being tested. As a result, essentially all valid data patterns may be generated for testing the interface in a relatively short amount of time, thereby increasing flexibility and speed while also providing a thorough test of the interface.

Other technical advantages will be readily apparent to one skilled in the art from the following figures, description, and claims.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
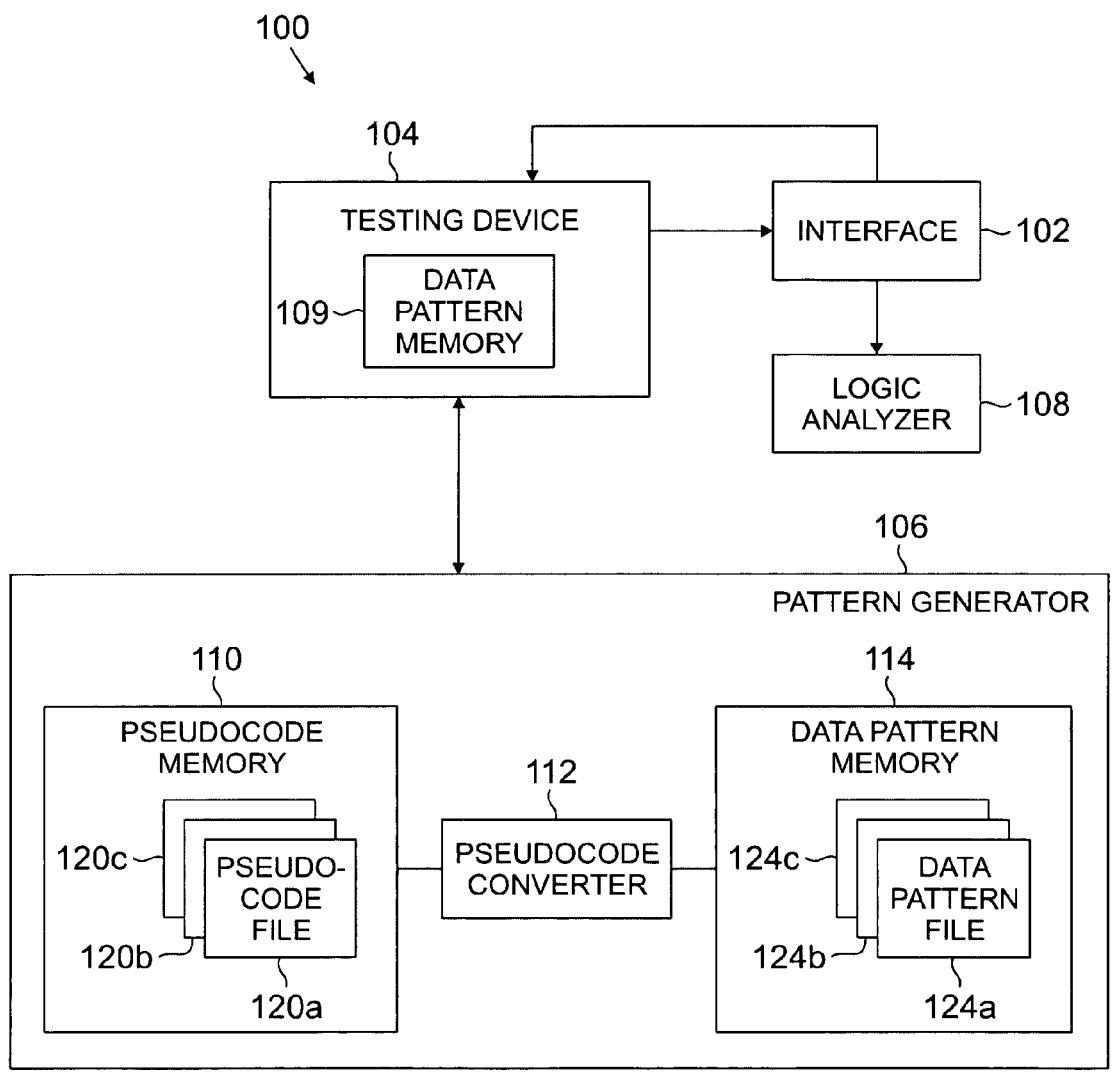
FIG. 1 illustrates a system for generating data patterns for testing a network interface according to one embodiment of the present invention.
Figure 2:
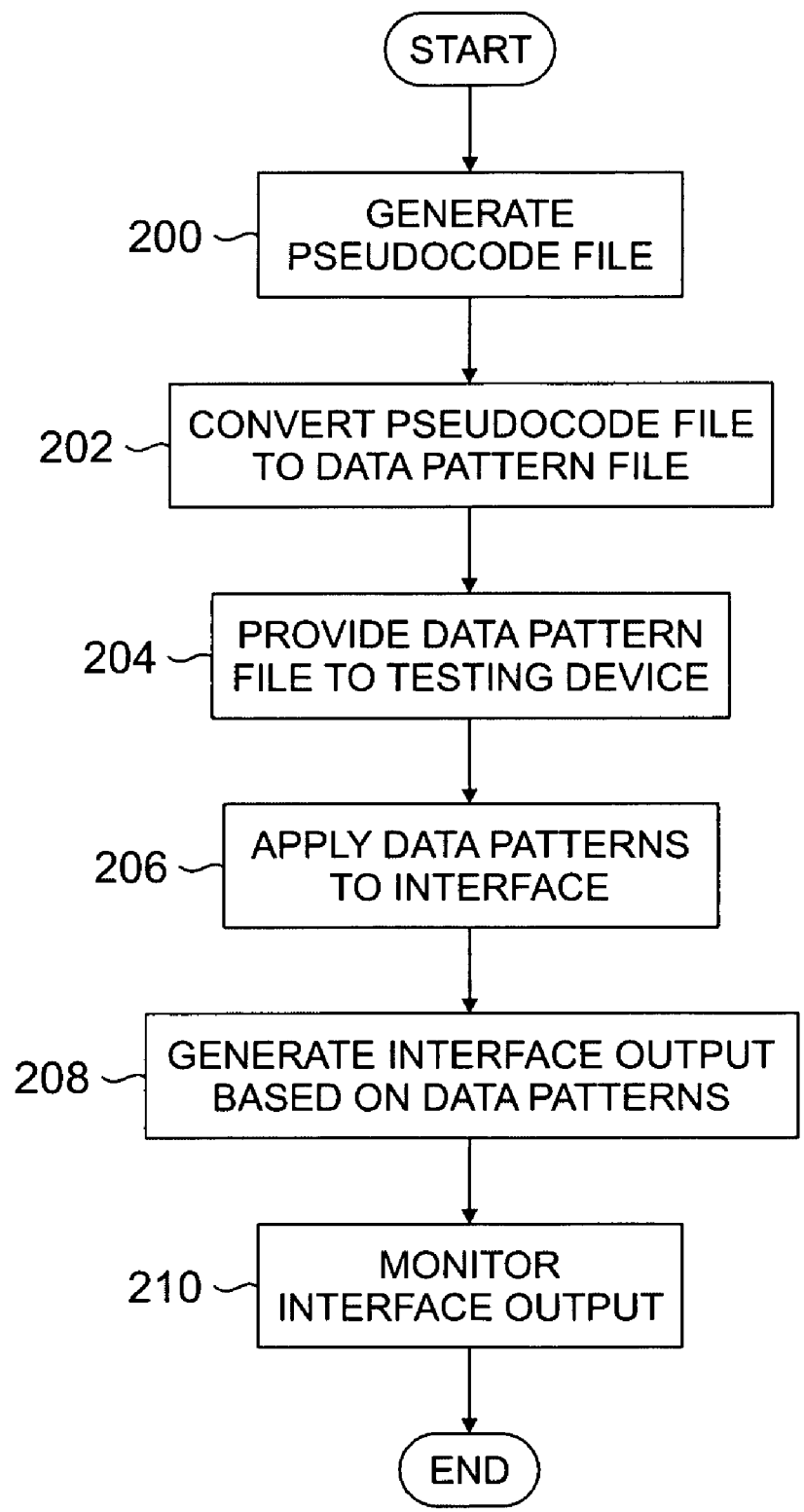
FIG. 2 is a flow diagram illustrating a method for testing the network interface of FIG. 1 according to one embodiment of the present invention.
Figure 3:
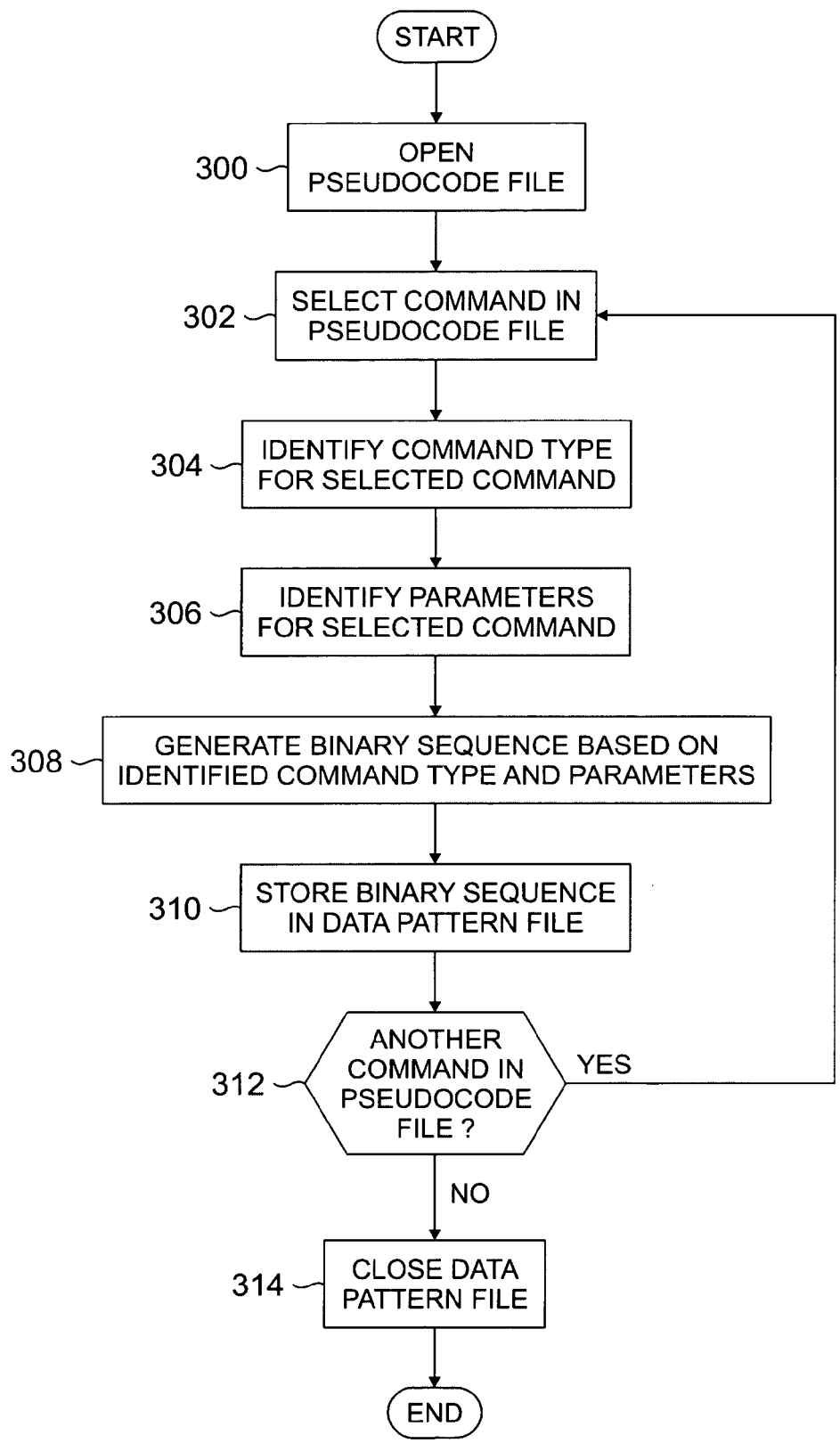
FIG. 3 is a flow diagram illustrating a method for generating data patterns for testing the network interface of FIG. 1 in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged interface testing system.

FIG. 1 illustrates system 100 for generating data patterns for testing network interface 102 in accordance with one embodiment of the present invention. In addition to interface 102, system 100 comprises testing device 104 and pattern generator 106. According to one embodiment, system 100 may also comprise logic analyzer 108.

For one embodiment of the present invention, interface 102 comprises a high-level data link control (HDLC) serial interface. However, it will be understood that interface 102 may comprise any Internet Protocol/Point-to-Point Protocol (IP/PPP) interface or any other suitable network interface without departing from the scope of the present invention.

Testing device 104 is coupled to interface 102 and applies data patterns to interface 102 in order to test interface 102. As described in more detail below, testing device 104 comprises data pattern memory 109, which stores one or more data patterns that may be applied to interface 102. In an advantageous embodiment, testing device 104 may be implemented in a card that is installed in a computer, such as a personal computer or any other suitable computer.

According to one embodiment, pattern generator 106 may be externally coupled to testing device 104. For example, pattern generator 106 may be implemented in a computer, such as a personal computer or any other suitable computer. In an alternate embodiment, pattern generator 106 may be implemented as part of testing device 104. Pattern generator 106 generates data patterns for testing interface 102 based on pseudocode files, as described in more detail below in connection with FIG. 2. Pattern generator 106 may comprise pseudocode memory 110, pseudocode converter 112, and optional data pattern memory 114.

Pseudocode memory 110 comprises any suitable data store that stores one or more pseudocode files 120a-c. Each pseudocode file 120 comprises a description of data to be generated for an interface, such as interface 102, to be tested. As used herein, "each" means every one of at least a subset of the identified items. As described in more detail below in connection with FIG. 3, the description of data to be generated may be provided in the form of a plurality of commands, with each command corresponding to a function to be tested via a data pattern. Thus, the data patterns are generated based on the commands in pseudocode file 120.

Although pseudocode memory 110 in the illustrated embodiment comprises three pseudocode files 120a-c, it will be understood that pseudocode memory 110 may comprise any suitable number of pseudocode files 120 without departing from the scope of the present invention.

Pseudocode converter 112 is coupled to pseudocode memory 110 and converts each of pseudocode files 120 into a corresponding data pattern for testing interface 102, as described in more detail below in connection with FIG. 3.

Data pattern memory 114 is coupled to pseudocode converter 112 and comprises any suitable data store that is operable to store one or more data pattern files 124a-c. Each data pattern file 124 comprises a plurality of data patterns that may be applied to interface 102 by testing device 104 in order to test the response of interface 102.

Although data pattern memory 114 in the illustrated embodiment comprises three data pattern files 124a-c, it will be understood that data pattern memory 114 may comprise any suitable number of data pattern files 124 without departing from the scope of the present invention. In addition, for one embodiment, data pattern memory 114 may be omitted. For this embodiment, pseudocode converter 112 is operable to write the converted data pattern files directly into data pattern memory 109 of testing device 104.

According to an exemplary embodiment, each data pattern file 124 (in addition to each data pattern file stored in data pattern memory 109) comprises a binary file. However, it will be understood that data pattern files 124 may comprise any suitable format for testing interface 102 without departing from the scope of the present invention. As described in more detail below, each data pattern file 124 is generated by pseudocode converter 112 based on a corresponding pseudocode file 120 in pseudocode memory 110. Each pseudocode file 120 defines an order for the data patterns in the corresponding data pattern file 124.

For one embodiment, pseudocode memory 110 and data pattern memory 114 may be implemented together in a single memory component. However, it will be understood that memories 110 and 114 may be implemented in any other suitable manner without departing from the scope of the present invention. For example, each one of memory 110 and memory 114 may comprise one or more memory components.

Data pattern memory 109 may comprise a copy of data pattern memory 114. In such an embodiment, data pattern memory 109 stores the same data pattern files 124 as data pattern memory 114. However, in an alternate embodiment, data pattern memory 109 may store different data pattern files or a combination of different data pattern files and some or all of data pattern files 124 that are stored in data pattern memory 114.

Optional logic analyzer 108 may be coupled to interface 102 and is operable to monitor the output from interface 102 in order to evaluate the results of tests performed by testing device 104 on interface 102. However, the output from interface 102 may also be monitored by testing device 104 either instead of or in addition to being monitored by logic analyzer 108.

FIG. 2 is a flow diagram illustrating a method for testing the network interface 102 in accordance with one embodiment of the present invention. Initially, pseudocode file 120 is generated (process step 200). In an advantageous embodiment, a designer or test engineer may generate pseudocode file 120.

Next, pseudocode converter 112 of pattern generator 106 converts pseudocode file 120 into a data pattern file, such as data pattern file 124 (process step 202). According to one embodiment, pseudocode converter 112 converts pseudocode file 120 into a binary data pattern file based on the method described below in connection with FIG. 3.

Optionally, pattern generator 106 may provide the data pattern file to testing device 104 (process step 204). However, for the embodiment in which data pattern memory 114 is omitted, the data pattern file is written directly into data pattern memory 109 and so does not need to be provided to testing device 104 after being generated. Testing device 104 applies the data patterns in the data pattern file to interface 102 (process step 206). Next, interface 102 generates an interface output based on the data patterns applied by testing device 104 (process step 208). The interface output is monitored in order to evaluate the results of the test (process step 210). Testing device 104 and/or logic analyzer 108 may monitor the interface output.

In this way, interface 102 may be tested based on essentially all valid data patterns. In addition, a designer or test engineer who generates pseudocode file 120 may incorporate impairment options into pseudocode file 120 in order to test possible errors in interface 102. Furthermore, abnormal data sequences may be incorporated into pseudocode file 120 in order to create invalid data patterns in the data pattern file for testing the response of interface 102 to those invalid patterns. The designer or test engineer may also choose to order the data sequences in pseudocode file 120 in any suitable order.

FIG. 3 is a flow diagram illustrating a method for generating data patterns for testing network interface 102 in accordance with one embodiment of the present invention. For this embodiment, the data pattern files, such as data pattern files 124, comprise binary files.

Initially, pseudocode converter 112 opens pseudocode file 120 (process step 300). Pseudocode converter 112 may identify the pseudocode file 120 to be opened based on a command line sequence entered by an operator of the system 100. The pseudocode file 120 comprises a plurality of commands.

Pseudocode converter 112 then selects a command in the pseudocode file 120 (process step 302). Initially, pseudocode converter 112 selects the first command in the pseudocode file 120. Pseudocode converter 112 then identifies a command type associated with the selected command (process step 304). In an exemplary embodiment of the present invention, the command types may comprise a flag command, a pseudorandom data command, an abort command, a bit command, an idle command, a shared bit flag command and/or any other suitable type of command.

Pseudocode converter 112 also identifies parameters associated with the selected command (process step 306). The parameters may comprise, for example, a number of flags for a flag command, a length and/or a number of non-modulo bits of trailer for a pseudorandom data command, a number of bytes of abort pattern for an abort command, a number of remaining bits for a bit command, a number of bytes of idle pattern for an idle command, a number of specific sequences to generate for a shared bit flag command and/or any other suitable parameters corresponding to any suitable command type.

Next, pseudocode converter 112 generates a binary sequence based on the identified command type and parameters (process step 308). Pseudocode converter 112 then stores the binary sequence in a data pattern file (process step 310).

Pseudocode converter 112 makes a determination regarding whether or not there is another command in pseudocode file 120 (process step 312). If there is another command in pseudocode file 120, the method returns to step 302, wherein pseudocode converter 112 selects the next command in pseudocode file 120. However, if there is not another command in pseudocode file 120, pseudocode converter 112 closes the data pattern file (process step 314) and the flow ends.

In this way, pseudocode converter 112 may generate a binary data pattern file with data patterns that testing device 104 may apply to interface 102 in order to test interface 102. This allows interface 102 to be tested based on essentially all valid data patterns, which may be generated relatively quickly.

Although the present invention has been described with several embodiments, various changes and modifications may be suggested to one skilled in the art. It is intended that the present invention encompass such changes and modifications as fall within the scope of the appended claims.

What is claimed is:

1. A method for testing a network interface comprising the steps of:
   generating a data pattern file based on a pseudocode file, the pseudocode file defining an order for a plurality of data patterns in the data pattern file; and
   testing the interface using the data pattern file.

2. The method as set forth in claim 1, further comprising the step of providing the data pattern file to a testing device, wherein the step of testing the interface using the data pattern file comprises the sub-step of applying the data patterns from the data pattern file to the interface with the testing device.

3. The method as set forth in claim 1, further comprising the steps of:
   generating an output from the interface based on the data pattern file; and
   testing the interface using the data pattern file comprising monitoring the output from the interface.

4. The method as set forth in claim 1, wherein the data pattern file comprises a binary file.

5. The method as set forth in claim 1, further comprising the step of generating the pseudocode file.

6. A method for generating data patterns for testing a network interface comprising the steps of:
   opening a pseudocode file that comprises a plurality of commands;
   for each command in the pseudocode file, identifying a command type and at least one parameter associated with the command;
   for each command in the pseudocode file, generating a binary sequence based on the identified command type and at least one parameter; and
   storing the binary sequences in a binary file, each binary sequence corresponding to a data pattern for testing the interface.

7. The method as set forth in claim 6, wherein the step of opening a pseudocode file comprises the sub-step of opening a pseudocode file identified by a command line sequence.

8. The method as set forth in claim 6, wherein the command types comprise two or more of a flag command, a pseudorandom data command, an abort command, a bit command, an idle command, and a shared bit flag command.

9. The method as set forth in claim 8, wherein the at least one parameter comprises a number of flags for a flag command, a length for a pseudorandom data command, a number of non-modulo bits of trailer for a pseudorandom data command, a number of bytes of abort pattern for an abort command, a number of remaining bits for a bit command, a number of bytes of idle pattern for an idle command, and a number of specific sequences to generate for a shared bit flag command.

10. A pattern generator capable of generating data patterns for testing a network interface, the pattern generator comprising:
    a pseudocode memory capable of storing at least one pseudocode file; and
    a pseudocode converter coupled to the pseudocode memory, wherein the pseudocode converter is capable of generating a data pattern file based on the pseudocode file, the data pattern file comprising a plurality of data patterns.

11. The pattern generator as set forth in claim 10, further comprising a data pattern memory coupled to the pseudocode converter, wherein the data pattern memory is capable of storing store at least one data pattern file generated by the pseudocode converter.

12. The pattern generator as set forth in claim 10, wherein the data pattern file comprises a binary file.

13. The pattern generator as set forth in claim 12, wherein the pseudocode file comprises a plurality of commands and the pseudocode converter is capable of generating the data pattern file based on the pseudocode file by:
opening the pseudocode file;
for each command in the pseudocode file, identifying a command type and at least one parameter associated with the command;
for each command in the pseudocode file, generating a binary sequence based on the identified command type and at least one parameter; and
storing the binary sequences in the data pattern file, each binary sequence corresponding to a data pattern for testing the interface.

14. The pattern generator as set forth in claim 13, wherein the command types comprise two or more of a flag command, a pseudorandom data command, an abort command, a bit command, an idle command, and a shared bit flag command.

15. The pattern generator as set forth in claim 14, wherein the at least one parameter comprises a number of flags for a flag command, a length for a pseudorandom data command, a number of non-modulo bits of trailer for a pseudorandom data command, a number of bytes of abort pattern for an abort command, a number of remaining bits for a bit command, a number of bytes of idle pattern for an idle command, and a number of specific sequences to generate for a shared bit flag command.

16. The pattern generator as set forth in claim 13, wherein the pseudocode converter opens the pseudocode file based on a command line sequence.

17. A system for testing a network interface comprising:
a pattern generator capable of generating a data pattern file based on a pseudocode file, the pseudocode file defining an order for a plurality of data patterns in the data pattern file; and
a testing device coupled to the pattern generator, the testing device capable of receiving the data pattern file from the pattern generator and testing the interface using the data pattern file.

18. The system as set forth in claim 17, wherein the pattern generator comprises a pseudocode memory capable of storing the pseudocode file; a pseudocode converter coupled to the pseudocode memory and capable of generating the data pattern file based on the pseudocode file; and a data pattern memory coupled to the pseudocode converter and capable of storing the data pattern file generated by the pseudocode converter.

19. The system as set forth in claim 17, wherein the testing device is further capable of monitoring an output from the interface to evaluate results of the test.

20. The system as set forth in claim 17, further comprising a logic analyzer coupled to the interface, wherein the logic analyzer is capable of monitoring an output from the interface to evaluate results of the test.

* * * * *